INVENTORS.
Nelson E. Rodgers
Rolf G. Gidlow

INVENTORS.
Nelson E. Rodgers
Rolf G. Gidlow

United States Patent Office 3,851,085
Patented Nov. 26, 1974

3,851,085
HYDROPROCESSING OF WHEAT
Nelson E. Rodgers, Wayzata, and Rolf Gunnar Gidlow, North St. Paul, Minn., assignors to The Pillsbury Company, Minneapolis, Minn.
Continuation-in-part of application Ser. No. 154,532, June 18, 1971. This application Feb. 15, 1973, Ser. No. 332,945
Int. Cl. A23l 1/10
U.S. Cl. 426—373
46 Claims

ABSTRACT OF THE DISCLOSURE

A method for hydroprocessing wheat, rye and oats to separate the endosperm from the husk and the germ tissues, wherein the starch granules of the endosperm are maintained in an intact, ungelatinized form and the gluten protein of the endosperm, in wheat and rye, is maintained in a dispersible and substantially undenatured state. The grains are steeped in an aqueous acid steeping medium for a time sufficient for the grain to sorb steeping medium equivalent to from about 56% to about 95% by weight of the grain, while maintaining a pH ranging from 0.8 to 2.5. The excess steeping medium is then separated from the hydrated grain and the grain is macerated to split the husk and expose the endosperm as a plastic mass. The macerated grain is dispersed in an aqueous dispersing medium to a concentration of 4% to 30% solids, while maintaining at least 90% of the non-endosperm tissue above a minimum dimension of 300 microns. The non-endosperm tissue in the dispersion is separated from the endosperm and the endosperm may then be adjusted to a higher pH. The endosperm can be used as a baking ingredient after concentration or drying or it can be separated into its component starch, gluten (from wheat and rye) and soluble products with or without a pH adjustment.

CROSS-REFERENCE TO RELATED APPLICATION

This application is a continuation-in-part of Ser. No. 154,532, filed June 18, 1971, by Nelson E. Rodgers et al., and entitled "Hydroprocessing of Wheat," which application is now abandoned.

BACKGROUND OF THE INVENTION

The present invention is directed primarily to a method for hydroprocessing wheat wherein the endosperm is separated from the non-endosperm tissue and wherein substantially all of the starch granules are maintained in an intact, ungelatinized form and the gluten protein is maintained in a dispersible and substantially undenatured state with respect to the doughing function. This hydroprocess can also be utilized for processing rye and oats.

A wheat kernel consists of three major components: the endosperm, the germ and the husk. The husk comprises the outer branny layers lying between and including the aleurone and pericarp tissues and envelopes the starchy endosperm (the source of white flour) and the germ. Although the aleurone, a dense layer of protein-rich, non-starchy cells, overlying the body of the starchy endosperm is technically of endospermal origin, it will be considered as part of the husk herein. In terms of the total weight of the wheat kernel, the husk typically comprises about 14.5%, the endosperm about 83% and the germ about 2.5%.

During conventional dry milling, wheat is ground and the husk, including the aleurone layer, and the germ are mechanically removed from the endosperm. The typical yield of white flour from a dry milling process is from 72% to 74% of the total weight of the wheat. This white flour contains some husk and germ fragments. A significant portion of the endosperm is removed with the husk and germ, thereby limiting the yield of white flour. When attempts are made to increase the yield of white flour, the percentage of husk, aleurone and germ in the flour is progressively increased.

The husk is removed during conventional dry milling because it is the primary source of color in flour, is deleterious to the function of the flour in some applications, and, in some circumstances, nutritionally injurious. The germ is removed to prevent rancid odors attending oxidation of the unsaturated fats contained in the germ.

The wheat flour, to be useful in baking leavened products such as breads and cakes, must support doughing function. In very general terms, doughing describes the phenomenon by which a loose mass of flour particles, when admixed with water, becomes a cohesive, resilient body of dough. As mixing is continued, a resiliently extensible matrix is formed which is capable of entrapping and retaining leavening gas bubbles and which forms an expanded structure which will persist through baking.

For several hundreds of years, dry milling was the only process for making flour from wheat. In more recent times, various techniques for wet milling have been tried with limited degrees of success. Rakowsky, et al., U.S. Pat. No. 2,358,827 discloses a method for wet milling wheat to obtain flour. In that method, the wheat is subjected to temperatures ranging from about 140° F. to 200° F. for from 5 to 10 minutes, after which the wheat is ground with at least 2 parts by weight water per part by weight wheat. During the grinding operation, the aqueous pulp is heated to between 140° F. and 200° F. for 10 to 30 minutes. After the grinding operation, the husk is separated from the wheat components and the filtrate is dried at temperatures ranging from 150° F. to 200° F. In this process, however, the starch obtained from the wheat is fully gelatinized and the gluten protein is completely denatured. Because of the starch gelatinization and the gluten denaturation, the doughing characteristics of the farinaceous product obtained thereby are very poor. The resulting product is therefore useless in making bread and bread-like products.

Additional methods for milling wheat and other grains using wet processing and milling techniques are illustrated in Bartmann, U.S. Pat. No. 1,670,015 and 1,670,016; De Sollano, et al., U.S. Pat. No. 2,930,699; Anderson, "Wet Milling Properties of Grains: Bench-Scale Study," Cereal Science Today, Vol. 8, No. 6, p. 190 (July 1963); and Radley, "Starch and Its Derivatives," 3rd Ed., Vol. 2, p. 27 (1953).

Wet milling of corn has, in the past, been more successful than the wet milling of wheat. This is primarily true because the gluten protein of the corn in deliberately degraded in the process of wet milling corn to promote the release of and to improve the purity of the corn starch.

Because starch is the primary desired constituent of corn, wet milling of corn by degrading the gluten protein is reasonably efficient and economical. A series of articles entitled "Wet Process Corn Milling" by Bartline appeared in the American Miller describing this process, e.g., see American Miller, August 1940, pp. 40, 41 and 82; September 1940, pp. 46–48 and 58; October 1940, pp. 28 and 30; December 1940, pp. 25–28, 30 and 84 and 85; February 1941, pp. 32–34 and 89; March 1941, pp. 48, 50, 97 and 98; May 1941, pp. 34–46, 104 and 105; June 1941, pp. 38, 40, 98 and 99; August 1941, pp. 40, 42, 81 and 82; October 1941, pp. 46, 47 and 85; November 1941, pp. 32, 33 and 37; and December 1941, pp. 34, 47 and 86.

Other articles showing wet milling of corn and grain sorghum are Watson et al., "Laboratory Steeping Procedures Used in a Wet Milling Research Program," Cereal Chem., Vol. 28, (1951) pp. 105–118 and Anderson, "A Pilot Plant for Wet Milling," Cereal Science Today (April 1957) pp. 78–80. Illustrative of patents disclosing the wet milling of corn are Lander, U.S. Pat. No. 1,391,065; Sherman, U.S. Pat. No. 1,554,301; Eckers, U.S. Pat. No. 2,556,322; Newkirk, et al., U.S. Pat. No. 2,573,048; Dowie, U.S. Pat. No. 3,029,169; Slotter, et al., U.S. Pat. No. 2,527,585; Burkhardt, U.S. Pat. No. 251,-827 and Willford, U.S. Pat. No. 1,061,933.

Although the literature is replete with descriptions of wet-milling techniques for corn and some other grains, there is, at present, no economical or efficient means of hydroprocessing wheat to obtain the endosperm free of husk and germ, wherein the starch granules of the endosperm are maintained in an intact, ungelatinized form and the gluten protein of the endosperm is maintained in a dispersible and substantially undenatured state with respect to doughing function.

SUMMARY OF THE INVENTION

The primary object of this invention is to provide an efficient, commercially operable method for hydroprocessing wheat to obtain the endosperm free of husk and germ, while throughout the process, maintaining the starch granules in an intact, ungelatinized form and the gluten protein in a dispersible and substantially undenatured state with respect to doughing functions.

Another object is to provide a method for hydroprocessing wheat wherein the yield of relatively pure endosperm is significantly increased when compared with dry milling.

A further object is to provide a hydroprocess which can be utilized for processing rye and oats, in addition to wheat.

The above and other objects are attained by this hydroprocess for separating the endosperm from the non-endosperm tissue. Although the hydroprocess is summarized herein in terms of wheat, rye and oats can be processed in this same manner.

This hydroprocess comprises the steps of steeping one part by weight of wheat in at least 0.6 parts by weight of an aqueous acid steeping medium at temperatures ranging from about 18° C. to about 45° C. until the wheat has sorbed medium equivalent to from about 56% to about 95% by weight of the wheat. The final moisture content of the grain is between 41% and 56% by weight of the hydrated grain. The steeping medium contains sufficient acid to maintain the pH of the steeping medium external of the wheat between 0.8 and 2.5 and to reduce the internal pH of the hydrated wheat to between 2.5 and 4.0. The residual steeping medium, containing extracted solubles, is generally separated from the hydrated wheat, after which the wheat is macerated. The macerated wheat is dispersed in an aqueous dispersing medium to a solids concentration of from about 4% to about 30% and the dispersion is maintained at a pH between 2.4 and about 3.4, while maintaining at least 90% by weight of the particles of non-endosperm tissue above a minimum dimension of 300 microns. The relatively intact non-endosperm tissue is separated from the dispersion. The pH of the dispersion may then be raised. The endosperm product can be further separated into its component parts or after concentration or drying, it can be utilized as a baking ingredient. Throughout this process, the starch granules of the endosperm are maintained in an intact, ungelatinized form and the gluten protein of the endosperm is maintained in a dispersible and substantially undenatured state with respect to doughing functions.

By utilizing this hydroprocess, a significant increase in yield of wheat endosperm can be attained over that attainable at a comparable level of purity by dry milling. Only minimal amounts of endosperm are lost when the husk and germ are removed from the endosperm and only traces of husk splinters and germ are present in the endosperm obtained by this process. These same results are obtained when rye and oats are hydroprocessed according to this invention.

DESCRIPTION OF THE PREFERRED EMBODIMENTS

Figure 1:
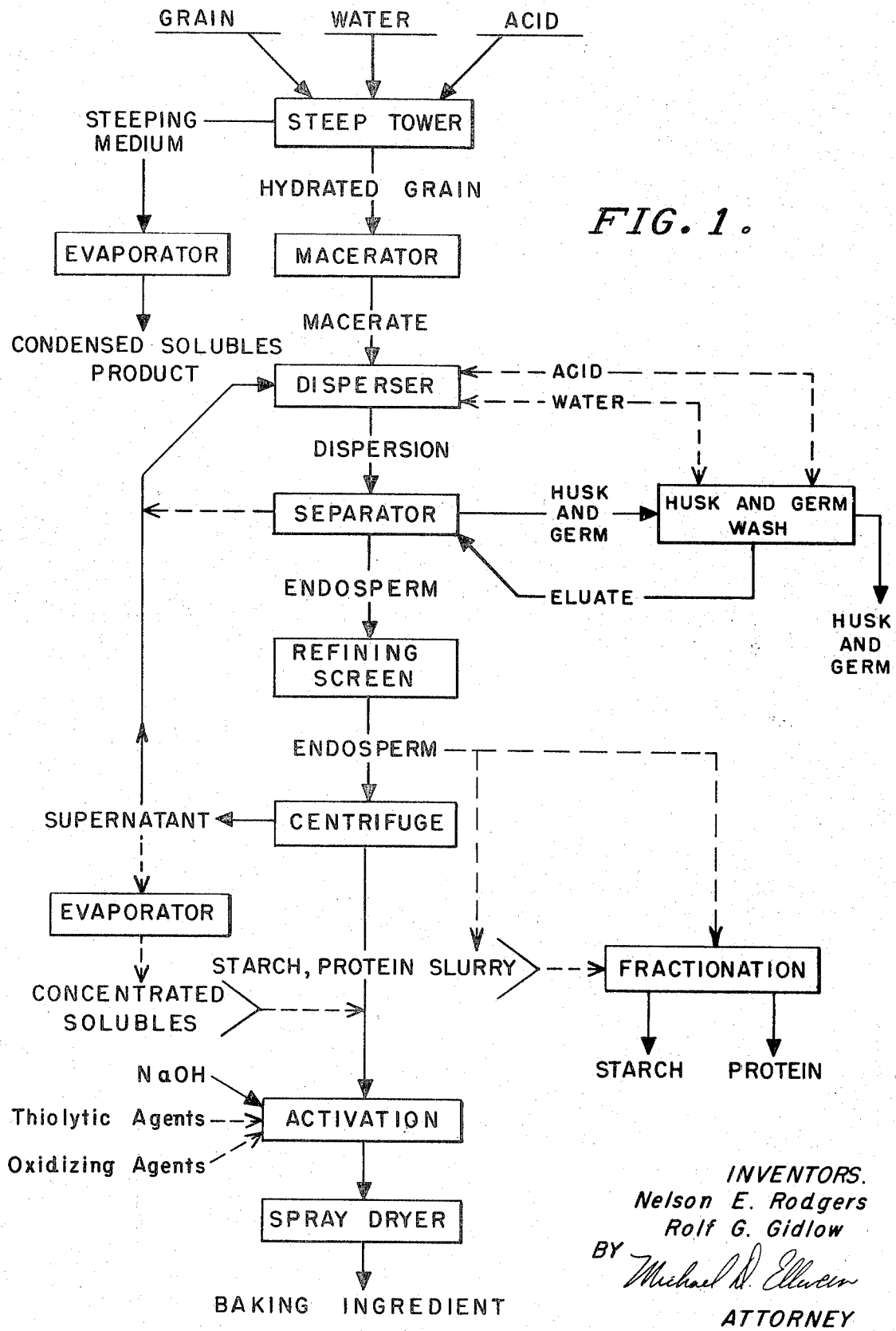
FIG. 1 is a schematic flow diagram of this hydroprocess wherein dotted lines indicate alternative treatments.

The hydroprocess of this invention is directed primarily toward an efficient commercially operable method of processing wheat. It has been found that the hydroprocess can also be utilized to process rye and oats.

The problems encountered in processing these three grains vary substantially. Wheat contains a relatively large amount of gluten protein which presents potentially severe problems of separating protein from the wheat constituents during the hydroprocess. The gluten complex in rye and oats is less significant and therefore the problems associated with hydroprocessing are minimized. Therefore, the preferred embodiments of the invention will be described in terms of wheat although the same processing conditions can be utilized to advantage with rye and oats.

The hydroprocess of this invention is initiated by steeping wheat in an aqueous acid steeping medium. The hydrated wheat is then separated from the residual steeping medium and macerated to split the husk envelope and expose the endosperm as a plastic mass. The macerated wheat is dispersed in an acid dispersing medium wherein sufficient shear is utilized to disengage the endosperm from non-endosperm tissue while maintaining at least 90% by weight of the particles of non-endosperm tissue above a minimum dimension of 300 microns. The non-endosperm tissue is then separated from the dispersed endosperm and the endosperm is generally concentrated or dried. Throughout this process, substantially all of the starch granules are maintained in an intact, ungelatinized form and the gluten protein is maintained in a dispersible and substantially undenatured state with respect to doughing function.

This hydroprocess can be performed either as a continuous process or a batch process. The various processing steps utilized herein will be described sequentially and more specifically below.

Steeping the wheat

Initially, in this hydroprocess, 1 part by weight of wheat is steeped in at least 0.6 parts by weight of an aqueous acid steeping medium at temperatures ranging from about 18° C. to about 45° C until the wheat has sorbed steeping medium equivalent to from about 56% to about 95% by weight of the wheat. The final moisture content of the steeped wheat should range from 41% to 56% by weight of the hydrated grain. The steeping medium contains acid in concentration and quantity sufficient to maintain the pH of the steeping medium external of the wheat between 0.8 and 2.5 and to reduce the internal pH of the hydrated wheat to between 2.5 and 4.0 from an initial pH of about 5.8.

Steeping wheat in a steeping medium as described above softens and swells the endosperm and renders the husk tissue pliable so that the endosperm can be cleanly disengaged from the adjoining aleurone layer without extensively disrupting the husk envelope. The germ, although hydrated, remains tough and largely intact throughout the steeping process and subsequent steps thus facilitating its separation from the endosperm. Throughout steeping, the wheat kernels remain largely intact with only a small fraction bursting to expose the endosperm.

The steeping medium is also instrumental in extracting most of the water-soluble color from the wheat, thus providing a final endosperm product which is essentially white. The low pH of the steeping medium also prevents microbial spoilage and represses respiration and autolytic reactions.

Additionally, the acid steeping medium reduces the internal pH of the wheat, preferably below 4.0, and reversibly alter the gluten protein sufficiently to supress glutenation into sticky masses and thus maintains the protein in a dispersible condition in subsequent processing steps. The reversible alteration of the gluten protein also minimizes adsorption of the gluten protein on the husk tissues and on surfaces of equipment used in this process.

Operationally, steeping wheat is rather simple. However, complex exchanges of soluble materials occur throughout steeping. Some of these exchanges include: sorption of water and acid by the wheat with concomitant decrease in the volume of the steeping medium; extraction of solubles from the wheat into the steeping medium; and reaction of the acid in the steeping medium with the solubles and with the basic materials in the wheat. Therefore, it should be understood that the composition and pH of the steeping medium and of the wheat are constantly undergoing change during steeping.

The steeping medium utilized herein is a mixture of water and strongly or moderately dissociated edible acids. Examples of such acids include hydrochloric, sulfuric, phosphoric and lactic acids. These acids can be utilized singly or in combination with each other with acceptable results. Hydrochloric acid is, however, highly preferable for use herein because, on terminal neutralization of the extracted endosperm, sodium chloride is generated in amounts compatible with usual formulations of dough products. Hydrochloric acid is also quite inexpensive and can be readily obtained in edible grades.

The acids other than hydrochloric acid can afford certain processing advantages such as increasing the rate of sedimentation of colloidally dispersed endosperm; however, the salts from these acids formed on terminal neutralization of the endosperm may affect dough performance in minor ways if such salts are present in large quantities. Accordingly, it is generally preferred that these acids be utilized in the steeping medium in combination with hydrochloric acid.

The steeping medium should contain sufficient quantities and concentrations of the strong and moderately dissociated acids to maintain the pH of the steeping medium external of the wheat between 0.8 and 2.5 and to reduce the internal pH of the hydrated wheat from an initial pH of about 5.8 to between 2.5 and 4.0. The internal pH should not be lowered below that pH at which the gluten will be irreversibly altered or denatured.

The initial pH of the steeping medium and the subsequent course of changes in pH of the steeping medium relate to the quantity of acid contained in the total volume of steeping medium. The quantity of acid should be sufficient to reduce the pH of the interior of the hydrated wheat to between 2.5 and 4.0 and, preferably, between 3.0 and 3.8. This reduction in pH is effected to suppress incipient micellar aggregation of the gluten protein during ensuing processing steps and to suppress enzymatic action. At the same time, the concentration of acid should be sufficient to maintain the pH of the steeping medium exterior to the wheat in the range of 0.8 and 2.5, preferably between 1.0 and 2.0. The acid steeping medium inhibits the growth of microorganisms in the steeping medium and on the surface of the wheat.

As steeping progresses, acid is sorbed by the wheat and also neutralized by acid binding substances extracted from the wheat into the steeping medium. During steeping, the wheat swells so that the submerged volume of the wheat increases to about 1.8 times the original volume. At least 1.0 part of steeping medium per part of wheat is required to keep the wheat completely submerged during steeping. Steeping can be accomplished mechanically with, for example, a nonflooded screw conveyor using as little as 0.6 parts steeping medium per part of wheat. However, this steeping method is usually slower, more expensive and, therefore, less desirable than submerged steeping. Generally, from about 1.0 part to about 5 parts of steeping medium per part of wheat are utilized in steeping. It is generally desirable to use a minimum volume of steeping medium to minimize cost of removing water during recovery of the solubles extracted during steeping or in processing the steeping medium for reuse. Therefore, it is preferred that 1.0 to 2.0 parts and, most preferably, about 1.25 parts of steeping medium be utilized per part of wheat. However, where more complete extraction of color is desired or recirculation of the steeping medium is practiced, the amount of steeping medum may range from 1.5 parts up to 5 parts steeping medium per part of wheat.

The quantity of acid in the steeping medium required to maintain the pH in the specified ranges depends upon the type of acid employed, the amount of steeping medium, and the level of sorption at which steeping is terminated. The quantity of acid can, therefore, be readily ascertained by correlating these variables within the ranges hereinafter specified. The amount of acid sorbed by the wheat from the steeping medium should, preferably, not exceed the amount of acid later required to establish the pH at near optimum in the dispersing step, later described.

Generally, spoilage by microorganisms is adequately suppressed when the pH of the steeping medium exterior of the wheat is maintained between 1.1 and 2.5. Where acid-tolerant microorganisms, notably certain types of yeast, are troublesome it is desirable to maintain the pH of the steeping medium between 0.8 and 1.7.

The wheat should be steeped at temperatures ranging from about 18° C. to about 45° C. until it has sorbed steeping medium equivalent to from about 56% to about 95% by weight of the wheat. The rate of sorption is relatively slow at lower temperatures and increases as the temperature increases (see Figure 2). It is therefore desirable to use temperatures of 18° C. or higher to minimize steeping time. It is also preferred that temperatures of above 45° C. not be utilized herein except for very short time periods to avoid incurring incipient biochemical damage to the starch and gluten protein. In order to minimize steeping time and avoid damage to the starch and protein, it is preferred that steeping temperatures used herein range from about 37° C. to about 40° C.

Figure 2:
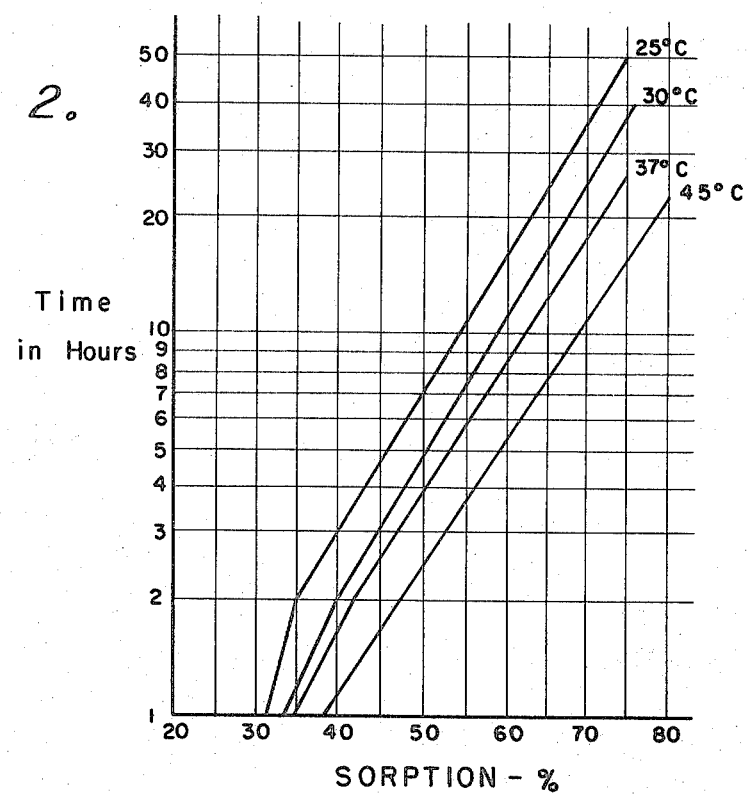
FIG. 2 is a graph illustrating the relationship of sorption of steeping medium by hard wheat to temperature and to the logarithm of time.

As shown in FIG. 2 for a mixture of hard red spring and winter wheat, the initial sorption of steeping medium is very rapid but the rate decays exponentially as indicated by the linear relation of sorption to the logarithm of time beyond 2 hours. The apparent deviation from linearity between 1 and 2 hours declines as the temperature increases from 25° C. to 45° C. Beyond 2 hours, the time to attain a given level of sorption must be increased about 220% (205% to 235% in FIG. 2) to increase sorption 10 percentage units.

The sorption pattern shown in FIG. 2 and in the tabulated examples was measured by difference in volume of initial steeping medium less the volume of the residual steeping medium. The sorption thus measured is about 4 percentage units higher than that measured by weighing the drained wheat. Unless indicated otherwise, sorption specified elsewhere in the specification and claims is on a weight basis and not on a volume basis. In experimental batch operations, weight sorption is measured by weighing the hydrated wheat after draining for a few minutes on a 1.0 mm. sieve with occasional stirring. The sorption value includes steeping medium clinging to the surface of the wheat which, as measured initially, amounts to about 16%.

The wheat, after steeping, should have a moisture content of from 41% to 56% and, preferably, from 45% to 48% by weight of the steeped wheat. The broad moisture content range corresponds roughly to the final moisture content after sorption of 56% to 95% steeping medium wherein the wheat had an initial moisture content of from 8% to 14%.

The level of sorption and the final moisture content relates to the energy required to disperse the macerated wheat and, concomitantly, the extent to which the husk and germ are fractured into undesirably small fragments. Accordingly, the wheat is steeped until it has sorbed steeping medium equivalent to from 56% to 95%, preferably 60% to 71%, and most preferably 64% to 66%, by weight of the wheat. Generally, steeping of the wheat can be accomplished in from about 5 hours to about 30 hours. At temperatures between 37° C. and 40° C., 64% to 66% sorption is usually obtained in 12 to 24 hours.

Agitation of the steeping medium by circulative percolation through the bed of wheat can be used to increase the rate of sorption. Agitation reduces the osmotic activity of extracted solutes concentrated in a static film at he exernal solution interface of the wheat. The rate and extent film at the external solution interface of the wheat. The rate and extent of extraction of soluble pigment from the husk may also be significantly improved by such treatment.

In the structure of the wheat kernel, a partially enclosed cavity of appreciable size underlies the crease of the kernel. When the kernel is submerged in steeping medium, the air in the cavity is not immediately displaced. Consequently, microorganisms residing in this space are imperfectly exposed to the growth inhibiting acid medium and, therefore, some growth of these microorganisms may occur. This difficulty can be eliminated by displacing the entrapped air either prior to steeping or during the initial phase of steeping.

The air can be eliminated during the initial phase of steeping, by reducing the air pressure over the wheat to less than 200 mm. of mercury and preferably less than 100 mm. of mercury either prior to or during submersion of the wheat in the steeping medium. By applying a vacuum to the wheat, air is drawn from the cavity and is replaced with steeping medium upon release of the vacuum. Steeping medium equivalent to about 5% to 6% by weight of the wheat is drawn in the cavity. A vacuum can be applied to the steeping medium containing the wheat in batch operations or in a continuous operation.

In an alternative method, the air surrounding the wheat in a holding vessel or silo can be diffusively replaced by gaseous carbon dioxide. When wheat so charged with carbon dioxide is submerged in the steeping medium, the carbon dioxide is absorbed into the aqueous phase with resultant flooding of the cavity.

Separation of wheat from residual steeping medium

When the wheat has sorbed sufficient steeping medium as described above, the residual steeping medium is usually drained from the hydrated wheat. In batch operations, this separation can be done simply by draining the excess steeping medium from the steeping vessel through a screen. Preferably, the drained wheat is washed with fresh steeping medium to remove residual pigment carried in the steeping medium adhering to the wheat.

The separation step can be accomplished as a batch operation, as described above, or the steeping and separation steps can be accomplished together in a continuous process. For example, steeping and separation of the steeping medium from the hydrated wheat can be accomplished in a continuous operation by introducing the wheat at the top of a cylindrical tower or silo. The steeping medium can be added confluently with the wheat but, preferably, it is introduced at the base of the tower to move countercurrently to the flow of wheat to effect efficient extraction of color. As the hydrated wheat is withdrawn from the base of the tower, the wheat moves downwardly at a rate providing the retention time necessary to attain the desired sorption.

When the flow of steeping medium is countercurrent to movement of grain, the hydrated grain can be removed directly from the bottom of the steeping tower into the screw of the macerating device later described. Hydrostatic balance is maintained by arranging the circuitry of the ensuing dispersion step so that its level is even with that of the steeping medium at the top of the tower. Compaction of the grain in the macerator impedes movement of steeping medium through the macerator. Spent steeping medium is removed from the top of the tower.

Alternatively, hydrated wheat may be removed by elevating the wheat from the base of the tower to above the hydrostatic level in the tower with, for example, a screw elevator or a hydraulic jet lift. Steeping medium can then be drained from the grain by a screen or drain screw and the hydrated wheat is delivered to the macerating step. When the flow of steeping medium is countercurrent to the movement of wheat, the drained steeping medium is returned to the base of the tower. Where the flow is concurrent, the spent steeping medium is discharged from the system. In the latter case, the drained grain can be lightly washed with fresh steeping medium to remove the adherent colored solution.

It should be recognized that this separation step can be accomplished in a great variety of ways with a variety of conventional equipment.

The residual steeping medium can be recycled, without treatment, if the extraction of soluble color from the wheat is not impaired or if extraction of soluble color is not required for a particular use. More generally, the color and other extractives are concentrated, for example, by ultrafiltration and the filtrate is recycled with additional acid to the steeping step. Similarly, color substances can be selectively adsorbed on activated charcoal or the like and the decolorized steeping medium can be recycled to the steeping step.

In circumstances where color is not detrimental to the endosperm product or fractions therefrom, the residual steeping medium can be used as a portion of the dispersing medium in the dispersing step. Alternatively, at least part of the residual steeping medium can be discharged with the hydrated grain to the macerator.

The residual steeping medium contains valuable extractives representing about 1.5% to 2.5% of the wheat solids. These extracted wheat solubles can be concentrated by evaporation or spray drying, preferably after neutralizing the residual acid to render the product less corrosive and better adapted to nutritional uses. The concentrated wheat solubles are of value as a concentrated source of vitamins, for certain nitrogenous compounds for use in human and animal foods, and in fermentation media.

Maceration of hydrated wheat

In this step of this hydroprocess, the husk of the hydrated wheat is split and the endosperm is exposed as a plastic mass. The manipulative step of splitting the husk and exposing the endosperm as a plastic mass has been called "maceration" herein. "Maceration" is used in the sense of crushing, squeezing and rubbing the wheat and is distinguished from cutting, chopping, or tearing of the wheat.

In this process, maceration is utilized to effect an initial breakdown of the structural association of the endosperm with the husk and the germ with minimum disruption of these non-endosperm tissues. This type of breakdown is necessary to enable subsequent dispersion of these components by hydraulic shear and elutriation.

Although the gluten protein and the glutenating properties thereof are somewhat altered during the steeping step, the concentration of water in the hydrated wheat during maceration is such that the endosperm is still potentially doughable. Consequently, it is important to accomplish maceration with a minimum of work and orientative shear to avoid micellar association of the gluten protein into difficultly dispersible masses.

In order to minimize micellar aggregation of the gluten protein, the internal pH of the wheat should be between 2.5 and 4.0 as hereinbefore stated. Ordinarily and preferably, the pH of the hydrated wheat will be between pH 3.0 and 3.8. At the lower end of this pH range, the endosperm can be worked to a greater extent with a lesser chance of formation of glutenous masses than at the upper end of this pH range. Accordingly, the work during maceration should be regulated inversely to the pH of the endosperm.

Effective maceration splits the husk envelope of over 99% of the wheat kernels andexposes the endosperm as a plastic mass which can be easily dispersed in subsequent operations. The husk envelope is fragmented into only a few pieces with, generally, over 90% of the husk being accounted for by particles over 1 millimeter in size. At least 90% by weight of the husk and germ must be maintained above a minimum dimension of 300 microns to achieve effective maceration. This condition enables clean separation of the husk from the endosperm in the downstream dispersing and separation steps. The aleurone layer of the endosperm remains firmly attached to the husk and, later, is removed from the endosperm with the husk. Removal of the aleurone layer is particularly desirable to obtain light-colored endosperm products since the aleurone tissue is highly pigmented.

Effective maceration also leaves the germ substantially intact as rather tough, rubbery, smoothly contoured bodies. The germ is released partly as free bodies and partly as bodies loosely attached to the husk. As with the husk, the relatively intact germ can be cleanly separated from the endosperm in ensuing operations. Because of its high content of unsaturated fats, clean separation of germ from endosperm contributes importantly to oxidative stability of products derived from the endosperm.

The crushing, squeezing and rubbing required during maceration can be accomplished with machines giving an extruding or mulling action. For bench-scale maceration, a common food chopper operated in the extrusion mode with a nut-butter plate is a suitable device. In the common food chopper, hydrated wheat is compressed by an auger feed against flat, shallow, spiral grooves in a rotating disk. Lateral displacement of the hydrated wheat through the grooves into the peripheral opening between the rotating disk and the body of the chopper causes the husk to split and exposes the endosperm as a plastic mass. When the effective depth of the peripheral discharge opening is between about 0.7 and 1.0 millimeters, considerably over 90% of the husk is accounted for in 2 or 3 pieces of over 1 millimeter in size and the germ is usually intact.

On a commercial scale, a Moyno-type pump is an effective macerator. Moyno-type pumps have been disclosed in the literature and have been commercially used in many operations. The forwardly progressing cavity of the pump which is evolved by the distinctive rotor-stator relationship is this machine, squeezes and mulls the wheat so that the endosperm is effectively exposed without extensively disrupting the husk envelope or the germ. Aqueous acid solutions can be injected through Moyno-type pumps to further reduce the pH concurrently with maceration, if desired.

Cone crushers can also be adapted to provide effective maceration. Here, two truncated cones are concentrically disposed so that the narrow space between the cones comprises an extrusion path and an annular orifice at the base ends. The outer cone is stationary, while the inner cone rotates as an extension of the shaft of an auger feed to the annulus formed between the truncated cones.

The hydrated wheat can also be extruded through slit-like orifices. The orifices should be tapered so that the feed side is somewhat wider than the discharge side to provide a path of gradual squeezing and crushing.

Dispersion of macerated wheat

Figure 3:
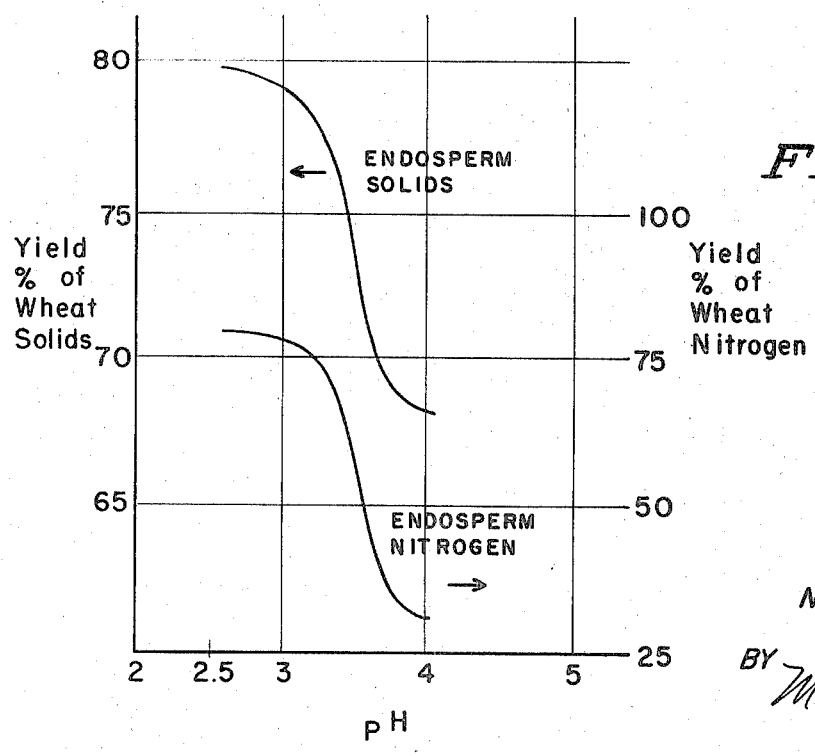
FIG. 3 is a graph illustrating the effect of pH of the dispersion of macerated wheat on the final yield of endosperm solids and the final yield of proteins from this process.

In this step of this hydroprocess, the macerated wheat is dispersed in an aqueous dispersing medium to a solids concentration of from about 4% to about 30%. The pH of this dispersion is maintained between about 2.4 and about 3.4 to obtain maximum yields as shown by FIG. 3. The pH of the dispersion can be raised as high as 4.0; however, the yield of endosperm solids may suffer as much as 12% (see FIG. 3). The macerated wheat is dispersed in the dispersing medium with sufficient shear to disengage the endosperm from particles of non-endosperm tissue while maintaining at least 90% by weight of the particles of non-endosperm tissue above a minimum dimension of 300 microns.

When recycle of process liquids is not practiced, the dispersing medium, like the steeping medium, is a mixture of water and strong or moderately dissociated edible acids. When recycle of process liquids is practiced as shown in FIG. 1, the dispersing medium contains, in addition to water and acid, soluble endosperm components. Examples of the acids useful herein include hydrochloric, sulfuric, phosphoric and lactic acids. These acids can be utilized singly or in combination with each other with acceptable results. Hydrochloric acid is preferred because it is inexpensive and the sodium chloride formed on terminal neutralization of the extracted endosperm is compatible with dough formulations.

The pH of the dispersion containing the macerated wheat and the dispersing medium should range from about 2.4 to about 4.0 and, preferably, from 2.4 to 3.4. It is highly preferred here that the pH of the dispersion be maintained between about 2.8 and 3.1. At a pH below 2.8 and especially below 2.4, irreversible degradation of the gluten protein may occur. Above pH 3.1 and especially above 3.4, the gluten protein tends to associate into difficulty dispersible masses and may be adsorbed on the husk and on the surfaces of equipment utilized in the process with a concomitant reduction in yield. It is also desirable to maintain the pH above 2.4 because the buffer capacity of the macerated wheat is relatively high in this range. Disproportionately large amounts of acid are required to lower the pH which result in high concentrations of sodium chloride in the final product.

It is evident that the total quantity of acid required for regulating the pH in this step of the process will vary with the quantity of acid used and sorbed in the steeping step. The importance of properly regulated pH is illustrated in FIG. 3. FIG. 3 indicates that the yield of endosperm solids and protein nitrogen increases as the pH of the dispersion is reduced to around pH 2.6.

Another important factor in this dispersing step is the concentration of solids in the dispersion. It is preferred herein to disperse the macerated wheat in the dispersing medium to a solids concentration of from about 4% to about 30%. By dispersing the wheat in a relatively large volume of dispersing medium, the tendency of the gluten protein to associate is greatly reduced. The appropriate level of solids in the dispersions depends, to some extent, on the type of equipment used in separating the finely particulate endosperm from the coarsely particulate husk and germ. This will be explained further hereinafter.

Dispersion is, preferably, effected by hydraulic shear which disintegrates the endosperm into a dilute suspension of fine particles and a solution of soluble components, while maintaining the husk and germ in a coarsely particulate state. This type of dispersion facilitates recovery of the endosperm in the separation step of this process. The macerated wheat should be dispersed rapidly to suppress glutenation of the gluten protein. The dispersing means should provide sufficient shear to disperse the endosperm components finely while maintaining the structural integrity of the husk and the germ tissue. Over 90% by weight of the husk and the germ should be retained on a 300-micron screen and, preferably, over 80% of the non-endosperm tissue should be retained on a 1000-micron screen.

By utilizing this dispersing technique, up to 99% of the endosperm is dispersed as particles substantially less than 300 microns in size. The remainder of the endosperm is comprised of schnitt, a fraction of endosperm with thick cell walls which resists disintegration. In later operation, the schnitt appears as tiny, scallop-shaped particles that are readily separated from the endosperm with the husk and germ fractions.

A wide variety of mixing or pumping equipment comprising an impeller which imparts shear between turbulent layers of liquid can be used in this dispersing step. The shear should be imparted by a dispersing means which acts on the body of liquid with relatively little cutting impingement on suspended particles.

One effective dispersing means involves a centrifugal pump arranged for recirculation to and from a holding reservoir. Marcerated wheat, water or recycled process solution used as a portion of the dispersing medium, and acid required for pH adjustment are directed into the reservoir and recirculated through the pump until the macerated wheat is sufficiently dispersed. In a continuous process, macerate and process liquids are continuously fed into the reservoir and the dispersion is withdrawn continuously through a tee in the outlet of the pump. The hydraulic circuit should be so arranged that the transition from the highly concentrated condition of the endosperm in the macerate to a dilute state in the dispersion is rapid. This minimizes the tendency of gluten protein to agglomerate when mechanically worked in a concentrated condition. An Oakes mixer can advantageously be used in conjunction with the centrifugal pump to disengage the endosperm from the husk and the germ.

The dispersion step can also be combined with the separation operation. For example, a submerged screen reel can be utilized to disperse the macerated wheat in the dispersing medium by arranging impeller blades or paddles radially on the rotating shaft supporting the cylindrical screen. The macerated wheat and the dispersing medium can be directed into the input of the reel where the macerated wheat undergoes rapid dispersion while moving through the body of the reel. The dispersed endosperm escapes through the rotating screen surrounding the rotating shaft while the husk and germ continue through the reel and are subsequently discharged at the outlet end.

Separation of non-endosperm tissue from endosperm

This step of the hydroprocess involves separating the relatively intact, non-endosperm tissue from the endosperm dispersion. It also involves in varying degree, depending upon the particular mechanical means employed, the continuing and terminal disengagement of the native bonding association of endospermal and non-endospermal tissues.

The appropriate concentration of solids in the dispersion is primarily dependent upon the particular means used in separating the endosperm and non-endosperm tissues. The hydrated husk presents an extremely bulky and springy mass which amounts to about two-thirds of the weight of the input wheat and therefore imposes severe congestion in the dispersion. When gravitation or hydraulic actuation is the driving force in a screen separation process, the dispersion should contain from about 4 to about 15% total solids, with 7 to 12% solids being operationally most satisfactory in single-stage processes. This solids level is used to prevent binding of the screens. When a centrifugal screen or like equipment is used in the separation step, dilute dispersions can be processed but it is advantageous from an economic standpoint to use more concentrated dispersions on the order of 15% to 30% total solids, with about 20% to 25% being operationally preferred.

The use of dilute dispersions in the separation step is not a serious economic handicap if the overall hydroprocess employs recycled process solution streams concurrently with mechanical concentration of particulate fractions. Endosperm extracts can be derived from this hydroprocess at 20% to 61% solids for direct use or for drying.

Although the separation means described herein are primarily directed to selective screening, it should be understood that this invention is not limited to specific separations means. A variety of separation means can be utilized herein without binding or fouling because the non-endospermal tissues are substantially intact and the pH is regulated to inhibit glutenation of the gluten protein. Any separation device or serial arrangement of such devices that will separate over 90% of non-endosperm tissue from finely particulate endosperm can be used herein.

A variety of gravitational or hydraulically actuated screening means can be utilized herein such as vibrating screens, static screens comprised of closely spaced, wedge-shaped bars in hemicylindrical or sloping arrays and screen reels. Examples of centrifugal screening devices include pusher screening centrifuges, centrifuges in which over-screen particles are propelled across the inner surface of a conical screen by a rotating helix or scroll, and open-ended conical screen bowl centrifuges.

The screen reel consists of a cylindrical screen axially supported on a rotating shaft. The screen is preferably submerged in a horizontal position in a collecting chamber. The ends of the cylindrical screen connect to input and output chambers which are sealed off from the collecting chamber by rotary seals situated peripherally on the ends of the cylinders.

The collecting chamber in which the reel is submerged is a rectangular tank with a V-shaped bottom where settling endosperm particles can concentrate. A screw or ribbon agitator is situated at the bottom of the V to propel the sediment layer to the discharge port at one end. Baffles mounted vertically in the chamber beneath the reel reduce turbulence generated by rotation of the screen reel. The collecting chamber is preferably large enough to provide relatively quiescent zones to the side of and below the reel thus enabling escape of particulate endosperm as it passes through the screen.

The distal end of the cylindrical reel is equipped with a spiral ribbon underlying the screen to propel the disengaged husk and germ to the discharge end. A series of paddles or beating blades can be mounted radially along the shaft in the input section of the reel to effect dispersion of macerated wheat concurrently with separation of endosperm from the husk and germ.

Although it is possible to obtain highly purified endosperm by using reel screens with effective openings of 500 microns or less, it is preferred to use coarser, more rugged screens on the reel and to remove minor amounts of residual non-endosperm tissue and schnitt in a subsequent refining step. Screens with effective openings of around 700 to 1200 microns are desirable and resist blinding and fouling. A 1000-micron screen usually retains over 80% to 90% of the husk, germ and schnitt from a dispersion wherein the macerated wheat is dispersed properly. The screens may be in the form of wire mesh, perforated metal or plastic, or wedge-shaped bars spaced parallel to the shaft of the reel.

The rotational speed of the reel depends on the scale of operation and whether the reel is being used to disperse the macerated wheat or simply being used for separation of the endosperm from the husk and germ. It is desirable to maintain a peripheral velocity such that attrition of the husk against the interface of the screen tends to purge the screen. A peripheral velocity on the order of 130 to 250 feet per minute is generally satisfactory.

The macerated wheat and dispersing medium are delivered to the input chamber and moved through the screen reel. Particulate endosperm and dissolved materials escape through the screen while the husk and germ are propelled through the reel to the output chamber. Particulate endosperm which is partially concentrated by sedimentation can be displaced to the distal end of the bottom of the collecting chamber by a screw or ribbon conveyor. The suspension of particulate endosperm with associated solubles is then, generally, pumped to the refining operation.

Various types of screening centrifuges can also be used herein. Screening centrifuges can operate with a relatively high solids concentration, as high as 25% to 30%. Thus, the separated endosperm, after centrifuging, is suited for spray drying without resort to recycle af the solubles stream and further concentration of particulate endosperm. Finer screens, having openings from about 80 to 200 microns, can also be employed with screening centrifuges.

When endosperm is separated from a highly concentrated dispersion, it is desirable to conduct separation in two stages, for example, by centrifugal screening. Thus, the husk and germ from the first stage centrifuge is redispersed in acidified water and passed through a second screening centrifuge. Due to the congested condition of the initial dispersion, only about 80% to 90% of the endosperm is separated in the first stage. The remaining endosperm is recovered as a relatively dilute dispersion in the second stage and can be returned to the first stage dispersing step wholly or in part as the dispersing medium.

Generally, in this process, the husk and germ are washed, as discussed above, with an acidified aqueous solution to complete the separation of the endosperm therefrom. Recycled dispersing medium or fresh, acidified water can be utilized in washing the husk and the germ. Washing of the husk and germ can simply be an elutriation of residual dispersed endosperm or, in addition, can be a terminal detachment of traces of endosperm bound to the aleurone layer of the husk.

The water introduced in countercurrently washing the husk and germ (see Figure 1), in a preferred method of practicing this invention, represents the total water input to the hydroprocess other than that introduced during steeping, because the effluent stream is utilized as the dispersing medium. Since the water sorbed during steeping is a relatively fixed quantity, the amount of water used in washing the husk and germ ultimately limits the concentration of solids attainable in the final product without resort to expensive evaporation of the dispersing medium. The dispersing medium, of course, contains soluble components of the wheat including the soluble proteins, sugars, polysaccharides and salts. These soluble components contribute importantly to functionality of the final product.

Where the husk and germ wash is simply one of flushing the dispersed endosperm from the husk, a variety of conventional washing means can be used, such as water dispersed through and then separated from the husk and germ by a vibrating screen, drain screw or screening centrifuge. In the case of separation by the two-stage centrifuge described above, the second stage is, in effect, the washing of the husk and germ since the amount of endosperm present is very small.

If it is desired to obtain a final endosperm product at a very high concentration of solids suited for direct incorporation into a dough without drying, very little fresh water is used in countercurrently washing the non-endosperm fraction. However, where it is desired to obtain substantially complete extraction of the endosperm in concentrations suited to economical spray drying, an input of about 1 to 2.5 parts of water per part of wheat can be used in washing the husk and the germ.

Sufficient acid should be added to the wash water to maintain the pH of the dispersion of husk and germ at between 2.4 and 4.0, preferably between 2.4 and 3.4. Hydrochloric acid is again the preferred acid although any of the hereinbefore discussed acids utilized in the steeping and dispersing steps of this process can be utilized herein.

The germ fraction can be separated from the husk by conventional means prior to mechanical dewatering and drying of the husk. Pneumatic elutriation of germ from the dried husk can also be employed.

The separated endosperm can be refined to remove a small residue of husk splinters, small germ particles and schnitt. These materials generally amount to less than 2% to 3% of the hydroprocessed wheat solids after primary separation.

The requirements for refining of the endosperm depend on the extent of dispersion of the husk prior to and during separation, the size of the screen used in the separation means, and the level of non-endosperm residues tolerable in the endosperm product. The completeness of removal of non-endosperm tissue is conveniently indexed by the content of crude fiber in the endosperm product. It is generally desirable to obtain an endosperm product containing less than 1.0% crude fiber, dry basis, and preferably around 0.5% or less. This range of fiber content prevails where maceration and dispersion are regulated so that the non-endosperm tissues are substantially intact, after dispersion, with not over 10% by weight being fragmented into particles with a minimum dimension of less than 300 microns.

Depending on process conditions and purity of endosperm desired, refining screens with openings on the order of 70 to 500 microns can be used. Screening centrifuges, vibrating screens, and static screens are suitable for this separation.

Under carefully regulated conditions, it is possible to obtain a purified endosperm without using a refining step. For example, using a dispersing reel-type screen with 1000-micron openings and hydraulic dispersion prior to screening, an endosperm yield of 82.2% of the solids of a hard wheat has been obtained with a crude fiber content of 0.5% without the refining step. After refining this endosperm with a 300-micron screen, the yield was 79.6% with a fiber content of 0.2%.

A further indication of the purity of the endosperm is seen in the relatively low content of chloroform extractable lipids, the unrefined and refined endosperm products referred to in the preceding paragraph containing 0.7% and 0.5%, respectively, on a dry basis. This is in comparison with a lipid content of 7.8% and 7.0% in the combined husk and germ fraction and in the refining over-screen fraction, respectively. Dry-milled white flour ordinarily has a lipid content around 1.4%.

Adjusting concentration of endosperm dispersion

Treatment of the endosperm dispersion, following separation of husk, germ and schnitt, depends on prior processing in relation to intended use of the extracted endosperm and the economical disposition of water.

Where the macerated grain has been dilutely dispersed (e.g., 4% to 15% solids) for separating endosperm from non-endosperm tissues in a reel-type separator, it is usually necessary to reuse a part of the solution portion of the separted endosperm as a part of the dispersing medium. This is effected by centrifugally concentrating the particulate fraction of the endosperm extract, including starch and gluten protein, as a slurry in part of the solution of soluble endosperm; then recycling the supernatant solution as a part of the dispersing medium. Thus, it is possible to separate endosperm from a dilute dispersion of macerate, while maintaining a materials balance in a system where the input of fresh water is limited.

Although not always necessary, recycle of the solution portion of the endosperm dispersible can also be practiced where endosperm is separated from more concentrated dispersions of macerate (e.g., 15 to 30% solids), using screening centrifuges. This is particularly desirable where it is intended to limit the input of water to the extent that the extracted endosperm can be used directly in a dough without drying. However, in any case, where it is economical to spray dry a baking ingredient or to separate starch and protein products from an endosperm extract separated from a concentrated dispersion of macerate, recycle may not be necessary.

It is possible to produce a more highly concentrated endosperm by evaporating or ultrafiltering water from a part or all of the supernatant solution from centrifugal concentration of the particulate fraction and then recombining the concentrated soluble endosperm with the particulate fraction. This may be done with or without recycle of a part of the solution fraction.

When recycle is practiced, the conduct of the centrifugal separation is an important factor in establishing a materials balance in this hydroprocess. The solids content at which the endosperm can be recovered depends on the proportion of input of macerated wheat solids to water contained in the wheat, water sorbed during steeping, and waer entering the process via the husk and germ wash less water extracted from the process by the hydrated husk and germ fractions (see FIG. 1). It is independent of the intervening dilution through the dispersing and separating steps. In equilibrated recycle, the solubles stream (the dispersing medium containing the soluble components obtained as the centrifugal supernatant) contains the same proportion of solubles to water as the proportion of solubles in the macerate to the net total input of water, thus separation of endosperm slurry in the proper concentration provides the soluble components in relation to the particulate components in the same proportion as in the input macerate. Also, the balance of input and output solids and water is maintained.

Table 1 below portrays an idealized materials balance, illustrating how proper centrifugal partition of output endosperm from the recycled solubles stream is essential to an equilibrated operation. In addition to the indicated input parameters, the defining operational conditions include 12% solids in the dispersion and separation of the husk and germ fraction at 35% solids. Note, in this particular example, that the operating volume of the dispersion at 808 parts is a function of the desired concentration of solids in the dispersion at 12% and the wheat input solids after steeping at 85.2 parts. For simplicity, the minor amount of acid used has not ben accounted for. In this circumstance, the endosperm product is centrifugally separated at about 21.6% solids. Note that both concentration of output endosperm and the equilibrium concentration of soluble endosperm in the recycle stream are determined by the net input of water to the system; i.e., the sum of grain moisture (13 parts), water sorbed in steeping (160 parts steeping medium minus 90 parts residual steep extract equals 70 parts sorbed), and husk and germ wash water (200 parts), less the water extracted in the husk-germ fraction (27.95 parts). Thus, the ratios of water to soluble solids in the endosperm output and in the recycle stream are identical at 39.0 to 1.

TABLE 1

| Fraction | Total, parts | Solids, parts | Water, parts | Solids concentration, percent |
| --- | --- | --- | --- | --- |
| Inputs: | | | | |
| Wheat | 100 | 87 | 13 | 87 |
| Steep solution | 160 | | 160 | |
| Husk-germ wash | 200 | | 200 | |
| Total | 460 | 87 | 373 | |
| Macerate: | | | | |
| Endosperm | | 70.21 | | 41.71 |
| Particulate | | 63.68 | | 37.84 |
| Soluble | | 6.53 | | 3.88 |
| Husk-germ | | 15.05 | | 8.94 |
| Total | 168.26 | 85.26 | 83.00 | 50.6 |
| Dispersion: | | | | |
| Particulate endosperm | | 63.68 | | 7.88 |
| Soluble endosperm | | 18.22 | | 2.26 |
| Husk-germ | | 15.05 | | 1.86 |
| Total (operating volume) | 807.86 | 96.95 | 710.91 | 12.00 |

TABLE 1—Continued

| Fraction | Total, parts | Solids, parts | Water, parts | Solids concentration, percent |
| --- | --- | --- | --- | --- |
| Separation: | | | | |
| Particulate endosperm | | 63.68 | | 8.33 |
| Soluble endosperm | | 18.22 | | 2.38 |
| Total | 764.86 | 81.90 | 682.96 | 10.71 |
| Recycle Stream: Soluble endosperm | 467.60 | 11.69 | 45.555 | 2.50 |
| Outputs: | | | | |
| Endosperm | 325.26 | 70.21 | 255.05 | 21.59 |
| Particulate | | 63.68 | | 19.58 |
| Soluble | | 6.53 | | 2.01 |
| Husk-germ | 43.00 | 15.05 | 27.95 | 3.580 |
| Steep extract | 91.74 | 1.74 | 90.00 | 1.89 |
| Total | 460.00 | 87.00 | 373.00 | |

In this idealized materials balance, had the input of water to the husk-germ wash been 100 or 50 parts per 100 parts of wheat, the endosperm product would be separated at 31.2% and 40.1% solids, respectively, and the equilibrium proportion of water to solubles in the recycle stream would be 23.8 and 16.1, respectively. This assumes that the solution content of the husk-germ fraction is quantitatively displaced with water in the countercurrent wash.

As the amount of wash water is reduced to low levels, the husk and germ retain increased amounts of the solution of solubles and substantial amounts of solubles may be discharged with the husk and germ.

Centrifugal concentration of the endosperm dispersion can be by-passed altogether where two-stage separation with screening centrifuges is employed and where only a moderately concentrated endosperm product is needed. This is possible because the screening centrifuge is capable of separating concentrated dispersions containing 25% to 30% solids. However, where more economical drying is desired and, particularly, where a highly concentrated endosperm product is needed for direct incorporation into a dough, it is generally advantageous to arrange the system for centrifugal concentration. This is done by limiting the water input to the husk and germ wash and by recycling the centrifugally separated solution of solubles, either wholly or in part, as the dispersing medium in the dispersing and separation steps. For example, the centrifugal output of endosperm can be equilibrated at about 40% solids by using only 50 parts of water in washing the husk and germ. Diversion of soluble endosperm to the husk-germ output where the wash water is thus limited, is minimized by using countercurrent washing.

Various configurations of decanting or sludging-type centrifuges can be used for concentrating the endosperm dispersion. Throughput rate and centrifugal force should be regulated to avoid compaction and glutenous consolidation of the protein so that the concentrated slurry is homogeneous.

Alternatively, part or all of the centrifugally separated solution of solubles can be concentrated by evaporation and later recombined with the concentrated particulate endosperm. This is useful where a relatively large amount of water is used to wash the husk-germ fraction exhaustively and the equilibrium level to which the endosperm at native composition can be concentrated centrifugally is thus limited. It is particularly useful for concentrating the output of endosperm where a two-stage centrifugal screening system is used in a straight-through separation without recycle of the solution of solubles.

Thus, for some purposes, the particulate fraction of endosperm can be centrifuged to provide a pumpable slurry at around 45% to 55% solids. The stream of separated solubles can then be evaporated to a suitable concentration such that, when recombined with the concentrated particulate fraction, a concentrate is obtained containing around 30% to 54% solids and with soluble and particulate components in the same proportion as in the original endosperm. This combination of concentration by evaporation and centrifuging is advantageous because it is not ordinarily practical to concentrate a thick dispersion by evaporation alone.

Preferably, the evaporation should be conducted at a relatively low temperature to avoid thermal damage to the endosperm components.

Activation of endosperm

Activation refers to chemical treatment of the endosperm to restore the glutenating properties of the endosperm protein. Activation is practiced, preferably, prior to removal of water from the endosperm dispersion and preparatory to direct use of the endosperm in dough, prior to drying the endosperm to obtain a farinaceous, flour-like substance having proper doughing qualities and, in some cases, before fractionating the endosperm into its component parts. Primarily, activation involves adjusting the pH of the endosperm product to a level more characteristic of bakery doughs. This pH adjustment changes the hydration and micellar state of the protein so that, when dough is mixed, a glutenous matrix is evolved which forms an extensible, gas-retaining film as the dough is leavened.

The pH of the endosperm product is, preferably, adjusted to a pH ordinarily characteristic of bakery doughs or flours, that is, from about 4.5 to about 6.5, to restore the glutenating properties of the gluten protein. Preferably, the pH ranges from about 5.8 to 6.1.

A wide variety of bases can be utilized to adjust the pH. For example, potassium hydroxide, calcium hydroxide and sodium hydroxide can be utilized herein. Sodium hydroxide is preferred as the sodium chloride formed on neutralization of the hydrochloric acid is compatible with most dough formulations. It is preferred that the bases utilized herein should be in rather dilute solution and added slowly with adequate mixing. Otherwise, transiently high pH in the endosperm may damage a portion of the gluten protein.

Chemical modification of the constituent biopolymers of hydro-processed endosperm can readily be accomplished under controlled conditions in the aqueous, homogeneous endosperm dispersion. Thus, the endosperm dispersion, in addition to being treated with a base, can be treated with reducing or oxidizing agents or combinations thereof to effect beneficial modification of the rheological properties of dough and attending qualities of baked product.

Particularly significant, are oxidizing agents and thiolytic reducing agents that affect the state and distribution of disulfide linkages within and between protein molecules. Such activating agents can be added to the endosperm dispersion either before or after adjusting the pH. The type or extent of modification of protein configuration can be regulated by adding the oxidizing and thiolytic agents singly, in combination or sequentially and by controlling the time, temperature, pH and agitation to obtain optimum effects. Ordinarily, such agents are used in concentrations on the order of 20 to 200 parts per million of endosperm solids.

In conventional dough, the reactions mediated by these agents transpire in a plastic mass of relatively low moisture content in a condition of plastic flow. In this circumstance, the biopolymers of flour are intimately associated and repeatedly contacted and disengaged. The character and extent to which chemical modification can be effected in the dry-milled flour is severely limited by constraints of time, temperature and agitation imposed in mixing and maturing of conventional doughs. The course of reaction of biopolymers, particularly the gluten-forming proteins, with activating agents in the fluid aqueous endosperm dispersion is not subject to such constraints.

Oxidizing agents, such as bromate and iodate salts, can be utilized with the hydroprocessed endosperm dispersion to improve machinability of dough and quality of baked products. Oxidizing agents and thiolytic agents can be utilized in combination to reduce mixing time and to eliminate the preliminary sponge dough development in commercial dough processes as taught by Henica and Rodgers, U.S. Pat. No. 3,053,666 (1962). Examples of suitable thiolytic reducing agents include cysteine, glutathione, thioglycerol, related thiol compounds and bisulfite salts. Examples of suitable oxidizing agents are oxyhalogen salts, such as bromates and iodates, peroxides, persulfate salts and oxygen.

Ingredients normal to dough, such as sugars and emulsified shortening, or compatible agents, such as sugar alcohols, edible glycols, surfactants and various electrolytes can also be added to the endosperm product to modify the polymeric associative states of the gluten protein and soluble polysaccharides.

Processing and utilization of endosperm

The highly refined dispersed endosperm usually comprises from 78% to 80% of the solids of the typical hard wheat. On a dry basis, it usually contains about 0.2% crude fiber and about 0.5% chloroform extractable lipids. The content of crude fiber and chloroform extractable lipids in the less refined product is on the same order or less than that usually found in dry-milled white flour. Thus, better than the 72% to 74% yield of straight white flour ordinarily obtained in dry milling of wheat to a comparable purity of endosperm.

The way the dispersed endosperm is finally processed depends on intended use. As shown in FIG. 1, the endosperm can be spray-dried to provide a flour-like baking ingredient. Of course, flash drying and/or freeze drying can also be utilized. As hereinbefore stated, the endosperm dispersion can also be concentrated to a level of solids suitable for direct incorporation into a baking dough without drying. This is highly advantageous in avoiding the costs of spray drying, packaging, storage and rehydration into a dough.

Another notable advantage of hydroprocessing lies in the flexible and adaptable separation of the aqueous endosperm dispersion into variously enriched or purified fractions. Fractions rich in starch, gluten protein or soluble components can be derived and used as such or variously recombined to formulate products adapted to special uses. Thus, starch-rich fractions and protein-rich fractions can be recombined and proportions adjusted in the image of flours adapted to the special requirements of bread, cake, cookies, crackers, alimentary products, etc. Heretofore, specialty flours have been primarily obtained by milling selected varieties of wheat, selection of mill-streams and, to a limited extent, by pneumatic classification of flour.

Purified starch and gluten fractions can be prepared by separating the particulate components of the endosperm from the soluble fraction at around pH 5.5 to 6.5 at a doughable concentration in excess of 55% solids. After mixing and maturing the dough, the starch can be washed from the gluten and further refined by conventional dough or batter processes recognized in the art.

Fractionation can utilize differential centrifuging or settling, precipitation, filtration, screening, flotation and combinations thereof. All of these processes are adapted to liquid-phase manipulation of the endosperm obtained by the hydroprocess and afford highly effective approaches to the utilization of wheat over that possible in the dry milling of flour.

Characteristics of the endosperm

This hydroprocess succeeds in maintaining the integrity of the wheat endosperm components necessary to proper function of leavened baked goods in the manner of conventionally dry-milled flour. The starch granules are ungelatinized, substantially intact, and not fractured. These starch characteristics are desirable because excessively gelatinized starch interferes with the proper distribution of water during development and maturation of dough. Additionally, mechanically damaged starch gelatinizes prematurely during baking which can interfere with normal development of gas retaining gluten films and resulting crumb structure. The fractured starch granules are also susceptible to attack by amylolytic enzymes.

Although the gluten protein is physically metamorphosed during this hydroprocess, it remains dispersible (not aggregeated in difficulty dispersible masses) and substantially undenatured with respect to the doughing function; i.e, not irreversibly altered with regard to development of resiliently extensible dough and the formation of gas retaining films necessary for proper leavening. Although the associative properties of gluten protein are greatly reduced during extraction of endosperm at a low pH, on activation by raising the pH, doughing functionality of the gluten protein is restored.

Wheat endosperm extracted by hydorprocessing can be clearly distinguished from dry-milled flour. The observable physical differences in some measure probably account for the distinctive rheological properties of dough prepared from hydroprocessed endosperm and the relative ease of extracting starch and protein fractions therefrom.

Dry-milled flour presents a wide range of particle reduction, including intact endosperm cells, starch-protein aggregates, formed residues of matrix protein, free starch and fragments of husk and germ. An appreciable portion of starch granules are fragmented and accessible to rapid attack by amylolytic enzymes.

On the other hand, when hydroprocessed endosperm is examined microscopically, there is substantially no vestige of cell organization. The starch granules are predominantly free and unassociated with protein and appear perfectly intact with no significant fragmentation or indentation. Damage, as measured enzymatically, is absent or substantially less than that of dry-milled flour. The protein appears as metamorphosed particles, bearing no resemblance to matrix protein. The metamorphosed state of the protein suggests that at least a part of the chemo-physical changes, ordinarily occuring in mixing dough, have been effected by the mechanical work imposed by maceration and dispersion and by liquid-phase activation.

When used as an ingredient in bread or biscuit doughs, hydroprocessed endosperm generally requires at least 30% less time to mix to optimum consistency than a corresponding dry-milled flour with concomitant economies in time and labor. The hydroprocessed endosperm can replace dry-milled flour in baked goods, wholly or in part, with little observable variance from the norms established for baked goods prepared from dry-milled flour.

EXAMPLES embodiments of this invention and are not intended to be limiting. All percentages and ratios in the following examples, as well as in the specification and in the appended claims, are by weight unless otherwise specified.

In Examples 1 through 4, bench scale hydroprocessing techniques were utilized. Mixtures of hard red spring and winter wheats were used in those examples. The following is a representative composition: moisture—11.8%; Kjeldahl nitrogen—2.39%; chloroform extractable lipids—2.19%; crude fiber—2.21%; ash—1.59%.

With the modifications specifically indicated in Examples 1 through 4, the following general procedure was used.

100 grams of wheat were steeped for 24 hours at 37° C. in a capped jar in 160 gms. of steeping medium consisting of 100 mN (millinormal) hydrochloric acid. After draining the residual steeping medium from the hydrated wheat on a 1000-micron screen, the volume of residual steeping medium was measured and the amount of steeping medium sorbed, expressed as percent sorption (milliliters of steeping medium sorbed per 100 grams of wheat), was estimated by difference. This volumetric index of sorption was expedient, but the estimate was about four percentage units higher than that obtained by weighing the drained wheat. The data in FIG. 2 and in Tables 2, 3 and 4 are expressed in this way. However, elsewhere in the specification and claims, unless indicated otherwise, sorption has been expressed on a direct weight basis.

The hydrated and drained wheat was then macerated in a Climax No. 5 food grinder, using a nut-butter extrusion plate with nine spiral grooves about 0.7 mm. deep. In this device, the wheat was squeezed laterally through flat spiral channels to the periphery of the rotating head. The macerating effect is thus distinguished from cutting, chopping or tearing. The husk of the hydrated wheat was split and the endosperm was exposed as a plastic mass when this hydroprocess was conducted within the limits heretofore set forth. Most of the husk envelope was split into a few large pieces over 1 millimeter in size and the germ was intact in nearly all cases.

The macerated wheat was mixed with 650 ml. of 10 mN hydrochloric acid in a beaker and then immediately transferred to the reservoir of the dispersing means. The dispersing means consisted of a 3-liter percolator jar with a bottom outlet, arranged for closed recirculation through a small centrifugal pump. After circulating through the pump for 10 minutes, the dispersion was discharged and the system was rinsed with an additional 650 ml. of mN hydrochloride acid. Combined with the rinse solution, the dispersion weighed 1468 grams and contained about 5.8% solids.

Separation was conducted by agitating the dispersion in a screen basket suspended in a 1500 ml. beaker. The cylindrical basket, constructed from stainless steel screen with 1000-micron openings, was 100 mm. in diameter and 108 mm. deep. The operating volume at the level of subergence in the dispersion was about 640 ml. Agitation was by an Extralon impeller submerged in the basket and driven at 200 r.p.m. This impeller is in a cage-like structure 2.6 inches wide and 2.5 inches high that circulates from top and bottom to center. This form of dispersing and separating means simulates the submerged rotary screen reel previously discribed, except, in this case, the screen is stationary and the dispersion is circulated against the screen.

After graduating for 10 minutes, the basket was raised above the beaker in a tilted position. The dispersion of endosperm was drained from the husk and germ, while moderately compressing the retained husk and germ against the screen with a spatula.

The separated husk and germ fraction was washed with 200 ml. of 5 mN hydrochloride acid by agitating for 10 minutes in a one-liter beaker with a Servodyne impeller at 200 r.p.m. The husk and germ were then collected on a 1-micron sieve and compressed firmly with a spatula until significant drainage ceased. The wash water was combined with the endosperm dispersion from the separation. In some instances, the wash treatment was repeated and the second wash water was used to wash the residue on the screen later employed to refine the endosperm product.

The endosperm dispersion from the separation, combined with the first husk wash water, was passed through a 300-micron stainless steel refining screen. When the husk was washed twice, the second wash water was used to wash the over-screen residue on the refining screen and added back to the endosperm dispersion.

The various fractions, including residual steeping medium, refined endosperm dispersion, refining over-screen residue and washed husk and germ, were weighed and anlyzed for constant of solids, Kjeldahl nitrogen, chloroform extractable lipid, crude fiber and ash, as appropriate.

EXAMPLE I

A mixture of hard red winter and spring wheats was steeped under the conditions described in the above experimental procedure, except that the duration of steeping was varied from 1 to 30 hours. The course of pH change in the steeping medium and the extraction of solids, Kjeldahl nitrogen, ash and color into the steeping medium in relation to time and sorption are shown in Table 2. The extracted color is in arbitrary units of the difference in light absorbance at 400 and 640 mn. multiplied by the volume of residual steep solution in milliliters.

The extraction of soluble components into a progressively decreasing volume of steeping medium is complex. Most of the sorption and extraction of ash and color occurs within ten hours while extraction of total solids and nitrogenous substances persists actively through 30 hour. At 24 hours and 68% sorption (64% by weight), extraction of components from the wheat amounted to about 2.0% of the solids, 3.8% of the nitrogen and 22% of the ash.

The particular lot of grain exhibited relatively slow sorption in comparison to that used in Example II.

accurate. Thus estimated, the yield was about 80 to 81% over the range of steep sorption.

Diversion of solids and nitrogen into the steeping medium increased appreciably with increasing time of steeping. Extraction of endosperm protein was generally more complete at 18 hours and longer.

As steeping and sorption progressed, the husk tended to fragment less during maceration and dispersion, as indicated by the decline in solids collected on the refining screen. However, in all cases, the particles of husk and germ were characteristically one to four millimeters long. Microscopic observation of the refined endosperm dispersions revealed only traces of husk tissue and no germ tissue. It was estimated very conservatively that over 90% of the weight of husk and germ was retained on the 1000 and 300-micron screens used for separation and refining.

TABLE 2

| Time | Sorption (volumetric) (percent) | pH of steeping medium | Solids in steeping medium Concentration, percent | Extracted, g. | Nitrogen extracted, mg. | Ash extracted, mg. | Color extracted, units |
|---|---|---|---|---|---|---|---|
| Hours: | | | | | | | |
| 1 | 29 | 1.29 | 0.54 | 0.71 | 12.0 | 148 | 23.2 |
| 2 | 38 | 1.30 | 0.69 | 0.84 | 18.3 | 174 | 28.5 |
| 4 | 46 | 1.40 | 0.81 | 0.92 | 27.4 | 215 | 31.9 |
| 6 | 51 | 1.45 | 0.97 | 1.06 | 33.8 | 242 | 33.9 |
| 8 | 56 | 1.50 | 1.12 | 1.16 | 40.6 | 266 | 36.4 |
| 16 | 63 | 1.60 | 1.53 | 1.48 | 58.2 | 306 | 37.7 |
| 18 | 64 | 1.69 | 1.67 | 1.60 | 63.4 | 332 | 40.8 |
| 21 | 67 | 1.79 | 1.83 | 1.70 | 68.9 | 344 | 42.4 |
| 24 | 68 | 1.81 | 1.95 | 1.79 | 72.0 | 343 | 41.3 |
| 27 | 69.5 | 1.89 | 2.00 | 1.81 | 78.6 | 357 | 39.5 |
| 30 | 70.5 | 2.00 | 2.21 | 1.98 | 85.0 | 376 | 42.5 |

The hydrated wheat was macerated as indicated heretofore and examined for dispersibility in the acid dispersing medium.

Wheat hydrated to 51% volumetric sorption (47% weight sorption and 40% moisture by weight of the hydrated wheat) macerated with great difficulty, requiring much power with strain on the macerating device. At 56% sorption (52% weight sorption and 42% moisture by weight of the hydrated grain), maceration was mechanical manageable but the husk was fragmented extensively and the endosperm disengaged incompletely and dispersed poorly in the dispersing medium. At 63% sorption (59% weight sorption and 44.5% moisture by weight of the hydrated grain), the separated husk and germ, as observed with a 7× lens, were relatively intact with very few particles less than one to four millimeters long. Although slow, disengagement and dispersion of the endosperm was nearly complete. At higher levels of sorption, disenagement and dispersion proceeded more rapidly. The supernatant was discarded.

EXAMPLE II

A mixture of hard red winter and spring wheats was hydroprocessed by the above experimental procedure, except that the period of steeping was varied from 15.5 to 30 hours. The results are shown in Table 3.

In contrast the preceding example, this lot of wheat hydrated rapidly, reaching 70% volumetric absorption in 15.5 hours and 78% in 30 hours. Over this range of sorption (66% to 74% by weight), maceration, dispersion and separation proceeded smoothly.

The yield of endosperm, as measured by sampling the refined endosperm dispersion, varied irregularly between 77.0 and 79.4% of the wheat solids, probably due to difficulty in sampling and rapidly settling dispersion. Since the husk-germ-schnitt fraction was measured totally, yield of endosperm measured by difference (i.e., 100 minus solids in residual steeping medium minus husk-germ-schnitt and over-screen solids) is probably more

TABLE 3

| Steeping time, hour | 15.5 | 18 | 21 | 24 | 24 | 27 | 30 |
|---|---|---|---|---|---|---|---|
| Process: | | | | | | | |
| Steep sorption (volumetric), percent | 70 | 71 | 74 | 74 | 74 | 75 | 78 |
| Steeping medium, final pH | 1.62 | 1.69 | 1.82 | 1.89 | 1.89 | 1.88 | 1.88 |
| Dispersion, pH | 3.05 | 3.02 | 3.06 | 3.08 | 3.08 | 2.98 | 2.98 |
| Yield*, percent: | | | | | | | |
| Solids in residual steeping medium | 1.82 | 1.99 | 1.96 | 2.04 | 2.05 | 2.24 | 2.32 |
| Endosperm solids | 79.4 | 77.8 | 79.3 | 78.2 | 77.7 | 77.0 | 77.5 |
| Refining over-screen solids | 2.48 | 2.15 | 2.20 | 2.09 | 1.91 | 1.67 | 1.60 |
| Husk-germ-schnitt solids | 14.7 | 16.0 | 15.8 | 15.8 | 16.0 | 15.3 | 16.0 |
| Total solids | 98.4 | 97.9 | 99.3 | 98.1 | 97.7 | 96.2 | 97.4 |
| Endosperm solids by difference | 81.0 | 79.9 | 80.0 | 80.1 | 80.0 | 80.8 | 80.1 |
| Nitrogen in residual steeping medium | 2.44 | 2.60 | 2.92 | 3.08 | 3.22 | 3.26 | 3.46 |
| Endosperm nitrogen | 72.8 | 75.7 | 76.1 | 73.7 | 75.7 | 73.7 | 75.3 |
| Nitrogen concentration (dry basis), percent: | | | | | | | |
| Residual steeping | 3.69 | 3.59 | 4.08 | 4.13 | 4.30 | 3.98 | 4.08 |
| Endosperm | 2.51 | 2.67 | 2.63 | 2.58 | 2.67 | 2.62 | 2.66 |

1 Percent of wheat solids or nitrogen.

EXAMPLE III

A mixture of hard red spring and winter wheats was hydroprocessed according to the above experimental procedure, except that the amounts of acid used in the steeping and dispersing media were varied to provide an endosperm dispersion having a pH in the range of 4.75 to 2.59.

Representative results are shown in Table 4. These and additional data were averaged to derive the yield curves depicted in FIG. 3.

The yield of endosperm solids approached maximum between about pH 3.1 and about 2.6. Above pH 3.1, the yield progressively declined to around pH 4. This effect is largely attributable to the incomplete extraction of endosperm protein, as reflected in the marked decline in nitrogen yield above pH 3.1. At pH 4.1, the extraction of nitrogenous substances was only about 37% of that obtained at pH 2.59. As the pH is increased above 3.1, the protein becomes progressively more glutenous and adheres to screens and equipment surfaces, causing blinding and fouling of the screens. A substantial amount of the gluten protein adheres to the husk and germ and separates with these fractions. The selective extraction of starch and soluble components from the endosperm is evident in the decrease in nitrogen content of the endosperm above pH 3.1.

The effects of glutenation were generally tolerable up to around pH 3.4 but it was preferred to operate at pH 3.1 or below. At higher pH levels, particularly above pH 3.4, the extraction became progressively more difficult to operate.

TABLE 4

| Steeping medium HCl, mN | 75 | 100 | 100 | 100 | 100 | 100 | 100 |
|---|---|---|---|---|---|---|---|
| Dispersing medium HCl, mN | 0 | 0 | 1.0 | 2.5 | 5.0 | 7.5 | 10 |
| Process: | | | | | | | |
| Steep sorption (volumetric), percent | 73 | 73 | 72 | 73 | 73 | 73 | 72 |
| Steeping medium, final, pH | 2.30 | 1.88 | 1.89 | 1.89 | 1.89 | 1.89 | 1.89 |
| Macerate, pH | 4.30 | 3.38 | 3.43 | 3.70 | 3.72 | 3.63 | 3.81 |
| Dispersion prior to separation, pH | 4.75 | 4.05 | 3.88 | 3.52 | 3.10 | 2.80 | 2.59 |
| Endosperm dispersion after separation, pH | 4.79 | 4.10 | 3.90 | 3.52 | 3.10 | 2.79 | 2.55 |
| Yield,[1] percent: | | | | | | | |
| Endosperm solids | 67.9 | 68.5 | 67.5 | 73.0 | 77.6 | 80.6 | 79.8 |
| Refining over-screen solids | 7.2 | 7.7 | 8.4 | 4.0 | 2.8 | 2.6 | 2.5 |
| Husk-germ-schnitt solids | 17.0 | 15.8 | 16.4 | 15.6 | 14.5 | 14.5 | 14.4 |
| Total solids [2] | 94.1 | 94.0 | 94.3 | 94.6 | 96.9 | 99.7 | 98.7 |
| Endosperm by difference | 73.8 | 74.5 | 73.2 | 78.4 | 80.7 | 80.9 | 81.1 |
| Endosperm nitrogen | 29.8 | 28.9 | 31.1 | 56.2 | 76.7 | 79.1 | 77.4 |
| Nitrogen concentration (dry basis): Endosperm, percent | 1.17 | 1.13 | 1.23 | 2.06 | 2.64 | 2.63 | 2.60 |
| Screen fouling | + | + | + | + | − | − | − |

[1] Percent of grain solids or nitrogen.
[2] Including 2.0% steep extract solids.

EXAMPLE IV

A mixture of hard red spring and winter wheats was hydroprocessed by the above experimental procedure. A part of the endosperm dispersion after separation of the husk and germ therfrom was passed through the refining screen and part was left unrefined. The pH of the dispersion was adjusted to about 5.8 with sodium hydroxide. The various fractions were freeze dried and analyzed.

The yields of refined and unrefined endosperm were 79.6% and 82.2% of the grain solids, respectively. The dry basis compositions of the fractions and, for comparison, the composition of the wheat and a typical 73% extraction flour dry-milled from a similar mixture of hard red spring and winter wheats are shown in Table 5. The low contents of lipid and fiber in the hydroprocessed endosperm products demonstrate how it is possible by hydroprocess to obtain a highly purified endosperm product in substantially better yield than is usually obtained in the dry-milling of white flour. The relatively high ash content of the endosperm products is largely attributed to sodium chloride generated from neutralization of the hydrochloric acid with sodium hydroxide.

TABLE 5

| | Nitrogen, percent | Lipid, percent | Fiber, percent | Ash, percent |
|---|---|---|---|---|
| Input wheat | 2.7 | 2.5 | 2.5 | 1.8 |
| Typical dry-milled white flour from hard wheat | 2.4 | 1.4 | 0.5 | 0.5 |
| Refined endosperm product | 2.6 | 0.5 | 0.2 | 1.8 |
| Unrefined endosperm product | 2.6 | 0.7 | 0.5 | 1.8 |
| Residual steeping medium | 4.3 | | | 2.0 |
| Refining over-screen | 3.6 | 7.0 | 8.3 | 1.6 |
| Husk-germ-schnitt | 3.0 | 7.8 | 13.0 | 3.3 |

Microscopic examination of the refined endosperm dispersion and a water dispersion of the refined dried product showed that the cellular structure of the endosperm had been completely disintegrated. The starch granules appeared as free particles substantially unassociated with the protein. The starch granules were completely intact with no evidence of fracture. The granules were uniformly anisotropic to polarized light and only very rarely was a granule stainable with Congo Red observed. Anisotropy to polarized light and impermeability to the dye, Congo Red, are evidence that the native molecular orientation of the starch was not altered by hydroprocess.

The gluten protein was physically metamorphosed from the matrix structure native to the wheat grain and appeared as irregularly shaped bodies containing very little occluded starch. These particles averaged about 88 microns and ranged from 15 to 300 microns in random dimension. Although the particles were irregular in outline, they were relatively smoothly contoured as compared to the sharply edged, conchoidal shapes of wedge protein fragments characteristic of dry-milled flour.

Examination of many microscopic fields revealed only traces of fragmented husk tissue and no germ tissue. From this, and on the basis of the comparative fiber contents of the endosperm and husk and germ fractions and their respective yields, it is estimated that at least 95% of the weight of husk and germ were retained on the 300 and 1000-micron screens used in separation.

In contrast, examination of a flour dry milled from a similar mixture of wheat showed that most of the endosperm was contained in intact or fragmented cells. Although many free starch granules were seen, the starch was mostly associated with cellular structures or imbedded in fragments of matrix protein. Many of the starch granules were fractured. Other granules, as well as the visibly damaged granules, were isotropic or only partially anisotropic to polorized light and stained with Congo Red. Many fragments of husk tissue and some germ tissue were observed.

A special test, involving concentration of insect fragments for examination, showed that the incidence of such fragments was significantly less in hydroprocessed wheat than in dry-milled flour.

EXAMPLE V

A mixture of spring and winter hard red wheat was hydroprocessed in a system adapted for batch steeping and continuous separaton of endosperm from husk and germ, using a two-stage centrifugal screen separation without recycle of the dispersing medium.

200 lbs. of wheat, containing 11.5% moisture, were steeped in 320 lbs. of 100 mN hydrochloric acid for 24 hours at 37% C. to 67% sorption by weight (47.2% moisture by weight of the hydrated wheat). The steeping medium was circulated continuously by percolation through the bed of wheat. The underflow was pumped through a heat exchanger to the top of the bed. The final pH of the steeping medium was 2.1.

The drained wheat was macerated in a Moyno pump at the rate of 3.13 lbs. of dry wheat equivalent per minute. The macerated wheat was continuously fed to a dispersing loop, consisting of a reservoir and two centrifugal pumps. The dispersing medium was the dilute dispersion of endosperm fed back from the second centrifugal screen. The macerated wheat was dispersed to a solids concentration of 25.4% and the dispersion was maintained at pH 3.0 by a controlled input of hydrochloric acid.

The dispersion was withdrawn continuously from the dispersing loop into the first stage of a two-stage centrifugal screen separating system. Mercone scroll-screen centrifuges were employed in both stages. Dispersed endosperm at 21.9% solids was withdrawn from the first screen centrifuge and the separated fraction of husk-germ-schnitt and residual endosperm was dispersed with water in a second stage dispersing loop at about 8.5% solids. This dispersion was separated by the second-stage centrifugal screen into a husk-germ-schnitt stream at 34.0% solids and a dilute dispersion of endosperm. The stream of dilute endosperm was passed through a bar-slot refining screen to remove husk splinters and small germ and thence directed as dispersing medium into the first stage dispersing loop. The over-screen was combined with the husk-germ-schnitt from the second centrifuge.

The effective screen openings in the separating system were as follows: first stage centrifuge—97 x 170 micron conical slot; second stage centrifuge—81 micron diameter round; refining screen—71 micron bar-slot.

The separated endosperm dispersion was centrifuged to concentrate the particulate fraction of 38% solids. The supernatant solubles stream was evaporated in a swept film evaporator to a concentration of 40% solids. The concentrated fractions were combined and spray-dried.

The dry basis yeields and nitrogen contents of the hydroprocess products were as follows: 138.5 lbs. of endosperm product, equivalent to 78.4% of input wheat solids, containing 2.62% nitrogen; 35.7 lbs. of husk-germ-schnitt, equivalent to 20.5% of the wheat solids, containing 3.02% nitogen; 4.20 lbs. of solubles extracted in the steeping medium, equivalent to 2.4% of wheat solids, containing 3.96% nitrogen.

EXAMPLE VI

Hard red spring wheat, rye and oat groats were hydroprocessed by the bench scale hydroprocessing techniques of Examples I through IV, except that 170 grams of 100 mN hydrochloric acid steeping medium were used per 100 grams of rye and oat groats. The endosperm and husk-germ-schnitt fractions were freeze-dried and analyzed. The process conditions, yields and compositions of the products are shown in Table 6.

TABLE 6

|  | Wheat | Rye | Oat groats |
|---|---|---|---|
| Process: |  |  |  |
| Steep time, hrs | 24 | 24 | 24 |
| Steep temperature, °C | 37 | 37 | 37 |
| Steeping medium, p./100 p | 160 | 170 | 170 |
| Steep sorption, wt. percent | 68 | 91 | 83 |
| Steep extract, pH | 1.98 | 2.39 | 2.51 |
| Endosperm dispersion, pH | 3.01 | 3.18 | 3.08 |
| Yield, percent: |  |  |  |
| Steep extract solids | 2.50 | 2.80 | 3.32 |
| Endosperm solids | 78.2 | 70.3 | 80.3 |
| Refining over-screen solids | 2.58 | 3.78 | 1.87 |
| Husk-germ-schnitt solids | 14.3 | 22.5 | 15.2 |
| Total solids | 97.6 | 99.4 | 100.7 |
| Steep extract nitrogen | 3.4 | 6.3 | 6.4 |
| Endosperm nitrogen | 75.6 | 64.4 | 74.1 |
| Husk-germ-schnitt nitrogen | 18.2 | 29.2 | 18.7 |
| Total nitrogen | 97.2 | 99.9 | 99.2 |
| Composition, dry basis, percent: |  |  |  |
| Grain nitrogen | 2.69 | 2.27 | 2.74 |
| Steep extract nitrogen | 3.67 | 4.92 | 5.43 |
| Endosperm nitrogen | 2.62 | 2.09 | 2.53 |
| Husk-germ-schnitt nitrogen | 2.90 | 2.52 | 3.37 |
| Grain lipid | 2.51 | 2.17 |  |
| Endosperm lipid | 0.86 | 0.77 | 6.14 |
| Husk-germ-schnitt lipid | 9.36 | 5.83 | 11.11 |
| Grain fiber | 2.88 | 3.24 |  |
| Endosperm fiber | 0.52 | 0.61 | 0.21 |
| Husk-germ-schnitt fiber | 16.0 | 10.7 | 11.9 |
| Grain ash | 1.87 | 1.91 | 2.11 |
| Endosperm ash | 1.32 | 1.62 | 1.48 |
| Husk-germ-schnitt ash | 3.17 | 1.56 | 2.98 |

As seen from the above table, rye and oats responded well to the hydroprocessing techniques of this invention, both with respect to yield and ease of operation.

EXAMPLE VII

Three samples of hydroprocessed whtat endosperm were utilized in the following baking test. The endosperm samples were obtained by bench scale hydroprocessing techniques as described in Examples I–IV.

The dry components of the bread dough comprised:

| Ingredients: | Percent |
|---|---|
| Hydroprocessed endosperm | 88.5 |
| Yeast food | 0.20 |
| Mixture of mono- and diglycerides | 0.75 |
| Nonfat dry milk | 1.70 |
| Salt | 1.60 |
| Shortening | 2.75 |
| Sugar | 4.50 |

59% water, on a dry ingredient basis, was used in the dough. The water and dry ingredients were mixed for two minutes and, after 10 minutes floor time, the dough was baked. In each case, satisfactory doughs and breads were produced. The volume and structure of the breads baked from hydroprocessed endosperm compared favorably with bread baked from conventional dry-milled flour.

EXAMPLE VIII

Results substantially similar to those achieved in the previous examples are obtained when the following wheats, or mixtures thereof, are substituted for the wheats used in these examples: hard spring red wheat, durum wheat, red durum wheat, hard winter red wheat, soft winter red wheat and white wheat.

What is claimed is:

1. A method for hydroprocessing wheat, rye and oats to separate the endosperm from the husk and the germ tissues, said process comprising the steps of:
   (a) steeping 1 part by weight of grain selected from the group consisting of wheat, rye and oats in at least 1.5 parts by weight of an aqueous acid steeping medium at temperatures ranging from about 18° C. to about 45° C. until the grain has sorbed steeping medium equivalent to about 56% to about 95% by weight of the grain, said steeping medium containing acid in concentration and quantity sufficient to maintain the pH of said steeping medium external of the grain between 0.8 and 2.5 and to reduce the internal pH of the hydrated grain to between 2.5 and 4.0;
   (b) macerating the hydrated grain to split the husk and expose the endosperm as a plastic mass while maintaining at least 90% by weight of the husk and the germ above a minimum dimension of 300 microns;
   (c) dispersing the macerated grain in an aqueous dispersing medium to a solids concentration of from 4% to about 30% and maintaining the pH of said dispersion between about 2.4 and 3.4; the dispersing shear being sufficient to disengage the endosperm from the husk and the germ tissues; and,
   (d) separating said dispersion into a particulate husk and germ fraction and an endosperm dispersion while maintaining throughout the process substantially all of the starch granules in an intact, ungelatinized form and maintaining substantially all of the gluten protein in a dispersible and substantially undenatured state with respect to doughing function.

2. The method of claim 1 wherein, during the dispersing step, at least 90% by weight of the husk and the germ are maintained above a minimum dimension of 300 microns.

3. The method of claim 2 wherein, after steeping, the residual steeping medium is separated from the hydrated grain.

4. The method of claim 2 wherein during the steeping step, 1 part by weight of grain is steeped in from 1.5 to 5 parts by weight of said steeping medium.

5. The method of claim 4 wherein the steeping medium contains acid in concentration and quantity sufficient to maintain the pH of said steeping medium external of the grain between 1.0 and 2.0 and to reduce the internal pH of the hydrated grain to between 3.0 and 3.8.

6. The method of claim 4 wherein, in the dispersing step, the pH of said dispersion is maintained at between 2.8 and 3.1.

7. The method of claim 5 wherein, after the separating step, a portion of the water is removed from said endosperm dispersion.

8. The method of claim 7 wherein separation of husk and germ from said dispersion is accomplished by selective screening.

9. The method of claim 8 wherein water is removed from said endosperm dispersion by spray drying said endosperm dispersion.

10. The method of claim 8 wherein, after the separating step, said endosperm dispersion is separated into a concentrated slurry of particulate endosperm and a solution containing dispersing medium and grain solubles, at least a portion of said solution being recycled to provide a portion of the dispersing medium.

11. The method of claim 10 wherein, after the separation step, the pH of said slurry is adjusted to between 4.5 and 6.5.

12. The method of claim 10 wherein said endosperm dispersion is separated by centrifugation into said concentrated slurry and said solution.

13. The method of claim 12 wherein at least a portion of said solution is concentrated and said concentrated solution containing said grain solubles is added to said slurry to obtain a final endosperm product.

14. The method of claim 13 wherein water is removed from said final endosperm product by spray drying.

15. The process of claim 14 wherein the grain is wheat and wherein said endosperm dispersion after separation of the husk and germ tissue therefrom contains at least 78% of the wheat solids, less than 0.5% crude fiber, and less than 0.7% chloroform extractable lipids.

16. The method of claim 15 wherein the acid utilized in said steeping medium is selected from the group consisting of hydrochloric, sulfuric, phosphoric and lactic acids.

17. The method of claim 16 wherein, after the separating step, a portion of the water is removed from said endosperm dispersion.

18. The method of claim 16 wherein said wheat is steeped at temperatures ranging from 37° C. to about 40° C. until said wheat has sorbed steeping medium equivalent to about 64% to about 66% by weight of said wheat.

19. The method of claim 17 wherein, during the maceration step, at least 90% by weight of the husk and germ are maintained above a minimum dimension of 1 millimeter and wherein during the dispersing step, at least 80% by weight of the husk and germ tissue are maintained above a minimum dimension of 700 microns.

20. The method of claim 17 wherein the husk and germ separated from the endosperm dispersion are washed with an aqueous acid solution while maintaining the pH of the solution at between 2.4 and 3.4 and, subsequently, utilizing this solution as at least a portion of the dispersing medium in the dispersing step.

21. The method of claim 17 wherein, after the separating step, said endosperm dispersion is separated by centrifugation into a concentrated slurry of particulate endosperm and a solution containing dispersing medium and wheat solubles, at least a portion of said solution being recycled to provide a portion of the dispersing medium.

22. The method of claim 21 wherein at least a portion of said solution is concentrated and said concentrated solution containing said wheat solubles is added to said slurry to obtain a final endosperm product.

23. The method of claim 17 wherein air is removed from the cavity in the wheat kernel before steeping is completed.

24. A process for hydroprocessing wheat, rye and oats to separate the endosperm from the husk and the germ tissues while maintaining throughout the process substantially all of the starch granules in an intact, ungelatinized form and maintaining substantially all of the gluten protein in a dispersible and substantially undenatured state with respect to doughing function, said process comprising the steps of:

(a) steeping 1 part by weight of grain selected from the group consisting of wheat, rye and oats in at least 0.6 parts by weight of an aqueous acid steeping medium, wherein said acid is an edible acid, at temperatures ranging from about 18° C. to about 45° C. until said grain has a moisture content of from about 41% to about 56% by weight of the hydrated grain, said steeping medium containing acid in concentration and quantity sufficient to maintain the pH of said steeping medium external of said grain between 0.8 and 2.5;

(b) mocerating said hydrated grain to effect an initial breakdown of the structural association of the endosperm with the husk and the germ while maintaining at least 90% by weight of the husk and the germ above a minimum particle dimension of 300 microns;

(c) disengaging the endosperm from particles of non-endosperm tissue to form an aqueous dispersion while maintaining a solids concentration of from about 4% to 30% and a dispersion pH of about 2.4 to 4.0; and, (d) separating said dispersion into a particulate husk and germ fraction and an endosperm dispersion.

25. The method of claim 24 wherein, during the disengaging step, at least 90% by weight of the husk and germ are maintained above a minimum dimension of 300 microns.

26. The method of claim 25 wherein, during the steeping step, 1 part by weight of grain is steeped in from 1.0 to 5 parts by weight of said steeping medium.

27. The method of claim 26 wherein the steeping medium contains acid in concentration and quantity sufficient to maintain the pH of said steeping medium external of the grain between 1.0 and 2.0 and to reduce the internal pH of the hydrated grain to between 3.0 and 3.8.

28. The method of claim 27 wherein, after the separating step, a portion of the water is removed from said endosperm dispersion.

29. The method of claim 28 wherein, after the separating step, said endosperm dispersion is separated into a concentrated slurry of particulate endosperm and a solution containing dispersing medium and grain solubles, at least a portion of said solution being recycled to provide a portion of the dispersing medium.

30. The process of claim 29 wherein the grain is wheat and wherein said endosperm dispersion after separation of the husk and germ tissue therefrom contains at least 78% of the wheat solids, less than 0.5% crude fibers, and less than 0.7% chloroform extractable lipids.

31. The method of claim 30 wherein the acid utilized in said steeping medium is selected from the group consisting of hydrochloric, sulfuric, phosphoric and lactic acids.

32. The method of claim 31 wherein said grain is steeped at temperatures ranging from 37° C. to about 40° C. until said grain has a moisture content of from 45% to about 48% by weight of the hydrated grain.

33. The method of claim 31 wherein, during the maceration step, at least 90% by weight of the husk and germ are maintained above a minimum dimension of 1 millimeter and wherein during the disengaging step, at least 80% by weight of the husk and germ tissue are maintained above a minimum dimension of 700 microns.

34. A method for hydroprocessing wheat to separate the endosperm from the husk and the germ tissues, said process comprising the steps of:

(a) steeping 1 part by weight of wheat in at least 1.0 part by weight of an aqueous acid steeping medium, wherein said acid is an edible acid, at temperatures ranging from about 18° C. to about 45° C. until said wheat has sorbed steeping medium equivalent to about 56% to about 95% by weight of said wheat and attained a moisture content of from 41% to 56% by weight of the hydrated wheat, said steeping medium containing acid in concentration and quantity sufficient to maintain the pH of said steeping medium external of said wheat between 0.8 and 2.5 and to reduce the internal pH of the hydrated wheat to between 2.5 and 4.0;

(b) draining said steeping medium from said hydrated wheat;

(c) macerating said hydrated wheat to effect an initial breakdown of the structural association of the endosperm with the husk and germ and to split the husk and expose the endosperm as a plastic mass while maintaining at least 90% by weight of the husk and the germ above a minimum dimension of 300 microns;

(d) dispersing the macerated wheat with force sufficient to disengage the endosperm from the husk and the germ tissue in an aqueous dispersing medium to a solids concentration of from about 4% to about 30%, while maintaining the pH of said dispersion between about 2.4 and about 4.0; and, (e) separating said dispersion into a particulate husk and germ fraction and an endosperm dispersion.

35. The method of claim 34 wherein, during the dispersing step, at least 90% by weight of the husk and the germ are maintained above a minimum dimension of 300 microns.

36. The method of claim 35 wherein, during the steeping step, 1 part by weight of wheat is steeped in from 1.0 to 5 parts by weight of said steeping medium.

37. The method of claim 36 wherein the steeping medium contains acid in concentration and quantity sufficient to maintain the pH of said steeping medium external of the wheat between 1.0 and 2.0 and to reduce the internal pH of the hydrated wheat to between 3.0 and 3.8.

38. The method of claim 37 wherein, after the separating step, a portion of the water is removed from said endosperm dispersion.

39. The method of claim 38 wherein, after the separating step, said endosperm dispersion is separated into a concentrated slurry of particulate endosperm and a solution containing dispersing medium and wheat solubles, at least a portion of said solution being recycled to provide a portion of the dispersing medium.

40. The method of claim 39 wherein at least a portion of said solution is concentrated and said concentrated solution containing said wheat solubles is added to said slurry to obtain a final endosperm product.

41. The method of claim 40 wherein, in the steeping step, 1 part by weight of wheat is steeped in from 1.0 to 2 parts by weight of said steeping medium until said wheat has sorbed steeping medium equivalent to from about 60% to about 71% by weight of said wheat.

42. The process of claim 41 wherein said endosperm dispersion after separation of the husk and germ tissue therefrom contains at least 78% of the wheat solids, less than 0.5% crude fiber, and less than 0.7% chloroform extractable lipids.

43. The method of claim 42 wherein the acid utilized in said steeping medium is selected from the group consisting of hydrochloric, sulfuric, phosphoric and lactic acids.

44. The method of claim 43 wherein, after the separating step, a portion of the water is removed from said endosperm dispersion.

45. The method of claim 44 wherein the husk and germ separated from the endosperm dispersion are washed with an aqueous acid solution while maintaining the pH of the solution at between 2.4 and 3.4 and, subsequently, utilizing this solution as at least a portion of the dispersing medium in the dispersing step.

46. The method of claim 44 wherein, after the separating step, said endosperm dispersion is separated by centrifugation into a concentrated slurry of particulate endosperm and a solution containing dispersing medium and wheat solubles, at least a portion of said solution being recycled to provide a portion of the dispersing medium.

References Cited
UNITED STATES PATENTS

| | | | |
|---|---|---|---|
| 2,358,827 | 9/1944 | Rakowsky et al. | 426—373 |
| 2,801,176 | 7/1957 | Ozai Durrani | 426—148 |
| 2,930,699 | 3/1960 | De Sollano et al. | 426—331 |

RAYMOND N. JONES, Primary Examiner

U.S. Cl. X.R.

426—460, 463, 464, 471, 484, 507